(12) United States Patent
Rheaume

(10) Patent No.: US 11,990,597 B2
(45) Date of Patent: May 21, 2024

(54) THERMAL REGULATION OF BATTERIES

(71) Applicant: Hamilton Sundstrand Corporation, Charlotte, NC (US)

(72) Inventor: Jonathan Rheaume, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 338 days.

(21) Appl. No.: 16/824,619

(22) Filed: Mar. 19, 2020

(65) Prior Publication Data

US 2020/0350648 A1    Nov. 5, 2020

Related U.S. Application Data

(60) Provisional application No. 62/821,278, filed on Mar. 20, 2019.

(51) Int. Cl.
*H01M 10/6568* (2014.01)
*H01M 10/18* (2006.01)
(Continued)

(52) U.S. Cl.
CPC ..... *H01M 10/6568* (2015.04); *H01M 10/486* (2013.01); *H01M 10/615* (2015.04);
(Continued)

(58) Field of Classification Search
CPC ........... H01M 10/6568; H01M 10/615; H01M 10/63; H01M 10/486; H01M 10/613; H01M 10/625; H01M 10/6561
See application file for complete search history.

(56) References Cited

U.S. PATENT DOCUMENTS 4,468,440 A * 8/1984 Evjen ................. H01M 10/613
429/8
8,047,318 B2   11/2011 Zhu et al.
(Continued)

FOREIGN PATENT DOCUMENTS

| CN | 108054459 A | 5/2018 |
| CN | 110474129 A | * 11/2019 |
| JP | 2015085699 A | 5/2015 |

OTHER PUBLICATIONS

Machine Translation of CN-110474129-A (Aug. 14, 2023) (Year: 2023).*

(Continued)

*Primary Examiner* — Matthew J Merkling
(74) *Attorney, Agent, or Firm* — Locke Lord LLP; Joshua L. Jones; Gabriella D'Angelo

(57) ABSTRACT

A battery thermal management system for an air vehicle includes a liquid heat exchange circuit, an air heat exchange circuit, and a liquid-air heat exchanger. The liquid-air heat exchanger is positioned on the liquid heat exchange circuit and the air heat exchange circuit to exchange heat therebetween. The system includes a coolant pump fluidically connected to the liquid heat exchange circuit, a flow restrictor positioned in the liquid heat exchange circuit, and a battery in thermal communication with the liquid heat exchange circuit. A method for controlling a thermal management system for an air vehicle includes sensing a temperature of a battery with a temperature sensor, varying a flow area of a flow path through a liquid heat exchange circuit with the flow restrictor if the temperature is below a pre-determined threshold, and operating a pump to provide heating to the battery if the temperature is below the pre-determined threshold.

17 Claims, 2 Drawing Sheets

(51) Int. Cl.
*H01M 10/48* (2006.01)
*H01M 10/613* (2014.01)
*H01M 10/615* (2014.01)
*H01M 10/625* (2014.01)
*H01M 10/63* (2014.01)
*H01M 10/6561* (2014.01)

(52) U.S. Cl.
CPC .......... *H01M 10/63* (2015.04); *H01M 10/613* (2015.04); *H01M 10/625* (2015.04); *H01M 10/6561* (2015.04)

(56) References Cited

U.S. PATENT DOCUMENTS

| | | | |
|---|---|---|---|
| 9,016,080 | B2 | 4/2015 | Brodie et al. |
| 9,583,801 | B2 | 2/2017 | Steinmeyer et al. |
| 9,623,719 | B2 | 4/2017 | Hatakeyama et al. |
| 9,701,215 | B1 | 7/2017 | Kim |
| 10,096,869 | B2 | 10/2018 | Zheng et al. |
| 10,099,531 | B2 * | 10/2018 | Labaste Mauhe ..... B60H 1/321 |
| 10,128,544 | B2 | 11/2018 | Cutright et al. |
| 10,150,570 | B2 | 12/2018 | Joubert et al. |
| 2005/0122684 | A1 * | 6/2005 | Chu ..................... H05K 7/2079 361/698 |
| 2013/0319029 | A1 | 12/2013 | Sekiya et al. |
| 2018/0304765 | A1 | 10/2018 | Newman et al. |
| 2019/0020078 | A1 | 1/2019 | Brinkmann et al. |
| 2020/0130534 | A1 * | 4/2020 | Julien ...................... F01P 3/12 |
| 2020/0303788 | A1 * | 9/2020 | Rheaume ............ H01M 10/625 |
| 2020/0303789 | A1 * | 9/2020 | Macdonald ............ B64D 27/24 |
| 2020/0303792 | A1 * | 9/2020 | Rheaume ............ H01M 10/625 |
| 2022/0285753 | A1 * | 9/2022 | Rainville ............... B64D 33/08 |

OTHER PUBLICATIONS

Extended European Search Report dated Sep. 8, 2020, issued during the prosecution of European Patent Application No. EP 20163952.3.
Communication Pursuant to Art 94(3) EPC dated Feb. 8, 2023, issued during the prosecution of European Patent Application No. EP 20163952.3, 4 pages.

* cited by examiner

THERMAL REGULATION OF BATTERIES

CROSS-REFERENCE TO RELATED APPLICATION

This application claims priority to U.S. Provisional Patent Application Ser. No. 62/821,278, filed Mar. 20, 2019, the contents of which are herein incorporated by reference in their entirety.

STATEMENT REGARDING FEDERALLY SPONSORED RESEARCH OR DEVELOPMENT

This invention was made with government support under contract number NNC14CA32C awarded by the National Aeronautics and Space Administration. The government has certain rights in the invention.

BACKGROUND OF THE INVENTION

1. Field of the Invention

The present disclosure relates to thermal management and more particularly to thermal management for aircraft batteries.

2. Description of Related Art

Aircraft batteries need thermal management to avoid damage due to overheating and overcooling. During cruise, the batteries on an aircraft may experience cold soak in which they run the risk of a substantial loss of capacity and a reduction in vehicle range. This is especially true for batteries that are idle, and therefore are not generating any heat on their own, which occurs during charge and discharge.

Depending on the storage location for the batteries, some areas may be climate-controlled and some may not be. Idle batteries that are not located in climate-controlled compartments may experience cold soak due to protracted exposure to subfreezing conditions common at cruising altitude. Even when batteries are located in a climate-controlled compartment, they may experience cold soak if a loss of fuselage pressure results in ambient air entering the compartment. Furthermore, cold soak may occur on cold days on the ground (e.g. overnight parking in cold climates).

The conventional techniques have been considered satisfactory for their intended purpose. However, there is an ever present need for improved thermal management for batteries. This disclosure provides a solution for this need.

SUMMARY OF THE INVENTION

A battery thermal management system for an air vehicle includes a liquid heat exchange circuit, an air heat exchange circuit, and a liquid-air heat exchanger. The liquid-air heat exchanger is positioned on the liquid heat exchange circuit and the air heat exchange circuit to exchange heat therebetween. The system includes a coolant pump fluidically connected to the liquid heat exchange circuit. The system includes at least one flow restrictor positioned in the liquid heat exchange circuit. The system includes at least one battery in thermal communication with the liquid heat exchange circuit.

In certain embodiments, the system can include a battery heat exchanger positioned on the liquid heat exchange circuit. The coolant pump can be upstream from the battery heat exchanger. The at least one flow restrictor can be positioned downstream from the battery heat exchanger. The at least one flow restrictor can be positioned upstream from the liquid-air heat exchanger. A motor can be operatively connected to the coolant pump to drive the coolant pump. The system can include a bypass valve positioned in the liquid heat exchange circuit upstream from the liquid-air heat exchanger. The system can include a bypass line branching from the liquid heat exchange circuit upstream from the liquid-air heat exchanger and reconnecting to the liquid heat exchange circuit downstream from the liquid-air heat exchanger. The system can include a bypass line valve positioned on the bypass line. The system can include a flow restrictor in the air heat exchange circuit to impede flow of a heat sink fluid to the liquid-air heat exchanger.

In accordance with another aspect, a method for controlling a thermal management system for an air vehicle includes sensing a temperature of at least one battery with a temperature sensor, and varying a flow area of a flow path through a liquid heat exchange circuit with at least one flow restrictor if the temperature is below a pre-determined threshold. The method includes operating at least one pump positioned in the liquid heat exchange circuit upstream from the at least one flow restrictor to provide heating to the at least one battery if the temperature is below the pre-determined threshold.

In certain embodiments, the method includes closing a bypass valve positioned in the liquid heat exchange circuit upstream from a liquid-air heat exchanger if the temperature is below a pre-determined bypass threshold. The method can include opening a bypass line valve in a bypass line branching from the liquid heat exchange circuit upstream from a liquid-air heat exchanger and reconnecting to the liquid heat exchange circuit downstream from the liquid-air heat exchanger. Varying the flow area of the flow path through the liquid heat exchange circuit can include at least partially reducing the flow area through the flow path with the at least one flow restrictor if the temperature is below the pre-determined threshold.

The at least one flow restrictor can be positioned in the liquid heat exchange circuit upstream from a liquid-air heat exchanger. The at least one flow restrictor can be positioned downstream from a battery heat exchanger. The temperature sensor can be operatively connected to a controller. The method can include providing heat to the at least one battery with a battery heat exchanger in heat transfer communication with the liquid heat exchange circuit. Operating the at least one pump can include generating heat by performing mechanical work with the at least one pump on fluid of the liquid heat exchange circuit causing a temperature of the fluid to increase. Operating the at least one pump can include driving the at least one pump with a motor and rejecting waste heat from the motor to fluid of the liquid heat exchange circuit. The at least one pump can be positioned upstream from a battery heat exchanger.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
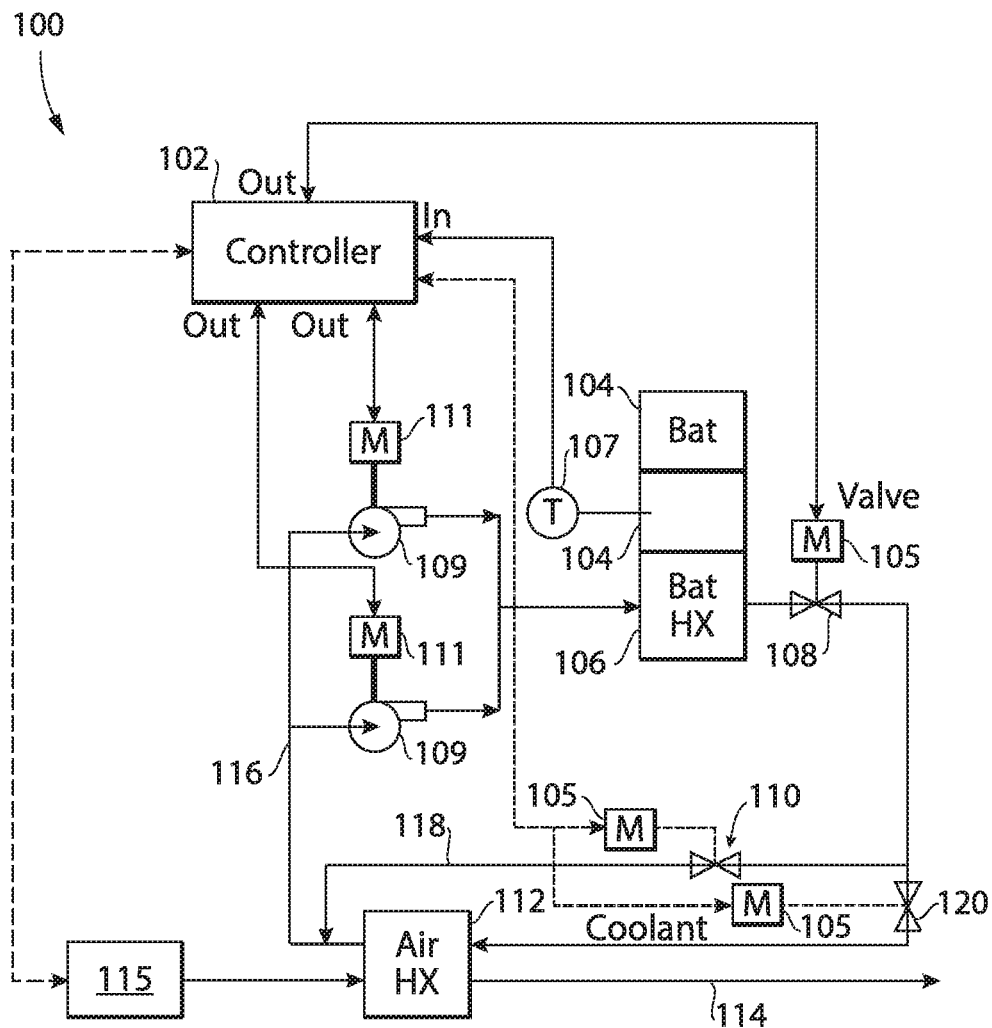
FIG. 1 is a schematic representation of an exemplary embodiment of a battery thermal management system constructed in accordance with the present disclosure, showing the battery operatively connected to a battery heat exchanger.

Reference will now be made to the drawings wherein like reference numerals identify similar structural features or aspects of the subject disclosure. For purposes of explanation and illustration, and not limitation, a schematic view of an exemplary embodiment of the battery thermal management system in accordance with the disclosure is shown in FIG. 1 and is designated generally by reference character 100. Other embodiments of the battery thermal management system in accordance with the disclosure, or aspects thereof, are provided in FIG. 2 as will be described. The systems and methods described herein can be used to keep batteries warm in order to avoid capacity loss or other degradation during cold soak. The systems and methods described herein utilize existing hardware on aircraft, or a minimal addition of hardware, for an efficient and cost-effective approach.

As shown in FIG. 1, a battery thermal management system 100 for an air vehicle includes a controller 102, a liquid heat exchange circuit 116, an air heat exchange circuit 114, and a liquid-air heat exchanger 112. Signals to and from the controller 102, indicated schematically by solid and/or dashed lines extending therefrom, can be routed to and from dedicated ports on the controller 102, or the sensors and actuators (described below) can be networked together with each device having its own address. In some embodiments, the components may communicate with the controller via a standard communication protocol involving the transfer of digital information. Those skilled in the art will readily appreciate that while certain inputs/outputs are shown controller could include a variety of other inputs/outputs. A liquid heat transfer fluid, coolant, circulates through said liquid heat exchange circuit 116, to transfer heat between batteries 104 and the coolant. The system 100 includes a battery heat exchanger 106 positioned on the liquid heat exchange circuit 116 in thermal communication with a bank of batteries 104. The bank of batteries 104 are in thermal communication with the battery heat exchanger 106. For example, these can be reserve batteries that are inoperative during cruise, or batteries of a hybrid electric aircraft propulsion system where the batteries and electric motors assist with takeoff and climb, but are inoperative during cruise. The batteries 104 could be positioned in a variety of positions throughout the aircraft, for example, in the wings (e.g. in the wing roots). In some embodiments, batteries 104 can furnish energy to a propulsion system for propulsion power or for transient operation (e.g. to avoid stall) or for other applications. The system 100 assists in avoiding drastic battery storage capacity loss that occurs at low temperature, thereby maintaining vehicle range (or diminishing range loss). In addition, some battery types cannot be recharged quickly at low temperatures, so it is an objective of this invention to reduce the time required to recharge batteries.

With continued reference to FIG. 1, coolant pumps 109 are upstream from the battery heat exchanger 106. Pumps 109 are fluidically connected to the liquid heat exchange circuit 114. Pumps 109 circulate heat transfer fluid to heat the batteries 104 downstream. The heat transfer fluid can be any of a number of fluids, including but not limited to water and other aqueous fluids, as well as polar and non-polar organic fluids. In some embodiments, the heat transfer fluid can be in liquid form, but can also be in gaseous form as well as including gas or liquid form such as in a vapor compression heat transfer loop. Examples of heat transfer fluids include but are not limited to glycols such as ethylene glycol or propylene glycol, alcohols such as methanol or ethanol, water and aqueous solutions such as heat transfer brines, and other organic fluids such as propane, butane, and substituted hydrocarbons (e.g., fluoro-substituted) and other organic compounds such as 2,2,3,3-tetrafluoropropene or 1,1,1,2-tetrafluoroethane. Flight-critical components of a propulsion system 100, such as a coolant circulation pump 109, may be present in duplicate on an aircraft for redundancy. In view of this, there are two pumps 109 that can operate on their own or in conjunction with one another. Moreover, it is contemplated that more than two pumps 109 can be used in system 100. Those skilled in the art will readily appreciate that pumps 109 can be centrifugal pumps, reciprocating pumps, screw pumps, diaphragm pumps, or any other suitable mechanical pumps. Respective motors 111 are operatively connected to each coolant pump 109 to drive their respective coolant pumps 109.

As shown in FIG. 1, controller 102 is in operative communication with pumps 109 and their respective motors 111. A flow restrictor, e.g. a control valve, 108 is positioned in liquid heat exchange circuit 116. In one embodiment, the control valve 108 is positioned downstream from a battery heat exchanger 106. Control valve 108 includes a motor operatively connected thereto to open and/or close the valve 108. A temperature sensor 107 is operatively connected to the batteries 104 and controller 102. Those skilled in the art will readily appreciate that, due to the complexities involved in obtaining a battery temperature, the temperature sensor 107 may be operatively connected to the heat transfer fluid exiting the battery heat exchanger 106 in liquid heat exchange circuit 116 as a proxy for battery temperature. Controller 102 is configured to receive information about battery temperature from temperature sensor 107 and relay a command, if needed, to one or more of motors 111, pumps 109, or valves 108, 110 and 120 (described below). In some embodiments, it is also contemplated that controller could send a command to temperature sensor 107. Those skilled in the art will readily appreciate that referring to "battery temperature," or other singular reference to a battery, could mean the temperature of an individual battery 104 or group of batteries 104. For valve 108, the command can be sent to motor 105, which in turns opens or closes valve 108. If the temperature is below a predetermined threshold, for example below five degrees Celsius, the controller 102 operates to command motors 111 and pumps 109 "ON" to generate heat by way of the mechanical work from pumps 109 and transfer the heat to the fluid of the liquid heat exchange circuit 116. The mechanical work from pumps 109 performed on the fluid actively heats it. In other words, no additional heating element is required on liquid heat exchange circuit 116 between coolant pumps 109 and the battery heat exchanger 106. Those skilled in the art will readily appreciate that in accordance with the First Law of Thermodynamics, the work imparted to the heat transfer fluid raises the internal energy of said fluid. In addition, the heat transfer fluid may also remove waste heat from the pump (e.g. bearings, motor drive, etc.). Those skilled in the art will readily appreciate that the work imparted to a fluid results from the change in the pressure and the change in volume of the fluid.

As shown in FIG. 1, in order to increase the work imparted to the fluid of liquid heat exchange circuit 116, system 100 includes a control valve 108 positioned in the liquid heat exchange circuit 116 upstream from the liquid-air heat exchanger 112 in order to help compress the fluid of circuit 116 to a high pressure. The control valve 108 is positioned downstream from the battery heat exchanger 106. The control valve 108 presents a flow restrictor that raises fluid pressure, increases mechanical work performed by pump 109, and thereby encourages fluid heating. Flow restrictor 108 can be a variety of suitable components such as an orifice, valve or the like. The control valve 108 can be adjusted over a range of operation: for example, normally open and partially closed (on command of controller 102) when battery heating is desired. In some embodiments, valve 108 is not completely closed in order to avoid possible damage to the pump 109. Valve 108 may be outfitted with features to ensure that it is not completely closed such as a restriction on its ability to close completely. In addition, a pressure relief valve (not shown) may be optionally located in liquid heat exchange circuit 116 between pump 109 and valve 108 that bypasses valve 108. The system 100 includes a bypass valve 120 positioned in the liquid heat exchange circuit 116 upstream from the liquid-air heat exchanger 112. The system 100 includes a bypass line 118 branching from the liquid heat exchange circuit 116 upstream from the liquid-air heat exchanger 112 and reconnecting to the liquid heat exchange circuit 116 downstream from the liquid-air heat exchanger 112.

With reference now to FIG. 1, the system 100 includes a bypass line valve 110 positioned on the bypass line 118. Bypass line valve 110 and bypass valve 120 include respective motors 105 in operative communication with controller 102 to receive open/close commands therefrom. In some embodiments, valves 110 and 120 can be combined into a three-way valve that directs flow either to liquid-air-heat exchanger 112 or to bypass line 118. Bypass line 118 assists in diverting around the liquid-air heat exchanger 112 to avoid cooling the fluid during cold soak conditions. If the temperature is below a second pre-determined threshold, which can be the same or different from the predetermined threshold described above, the controller 102 operates to command valve 110 open and 120 close (e.g. by way of their respective motors 105). Motors 105 receive a command from controller and, in turn, operate to open or close their respective valves 110 or 120. The reverse command can be executed once the temperature rises back up above the second pre-determined threshold. Valves 108, 120 and/or 110 can be a gate valve, a globe valve, a needle valve, or any other proportional valve. In some embodiments, an orifice restriction can be used in addition to, or in lieu of, valves 108, 110 and 120.

With continued reference to FIG. 1, the liquid-air heat exchanger 112 is positioned on the liquid heat exchange circuit 116 and the air heat exchange circuit 114 to exchange heat therebetween. The air heat exchange circuit 114 includes a flow restrictor, e.g. a ram air door 115, to impede flow of a heat sink fluid (e.g. ram air) to the liquid-air heat exchanger 112 during cold soak conditions, described in more detail below. Ram air is air outside of the fuselage of an aircraft. While the heat sink for air heat exchange circuit 114 is described herein as ram air, those skilled in the art will readily appreciate that heat exchange circuit 114 can be operatively connected to other ducts to receive fan duct bypass air, cabin outflow air, conditioned air from an environmental control system, or the like. Ram air door 115, when at least partially opened, provides cooling air during idle and non-idle conditions. Air heat exchange circuit 114 can also include a fan or the like for idle conditions. In the systems and embodiments of the present invention, the flow of cooling air can be curtailed or eliminated during cold soak conditions by closing the ram air door 115, either partially or fully. The flow restrictor, e.g. ram air door 115, can similarly be operatively connected to controller 102 and can receive a close or open command therefrom depending on the temperature measured at the temperature sensor 107. In embodiments where several heat exchangers share a common ram air duct, the air heat exchange circuit 114 may be optionally outfitted with an air splitter (not shown) to branch the flow of ram air to individual heat exchangers. In this case, the flow restrictor can be a flow control valve such as a butterfly valve can be located upstream of liquid-air heat exchanger 112 to restrict flow. Those skilled in the art will readily appreciate that, in some embodiments, fluid in the heat exchange circuit 114 can vent outside of the aircraft after going through the liquid-air heat exchanger 112.

Figure 2:
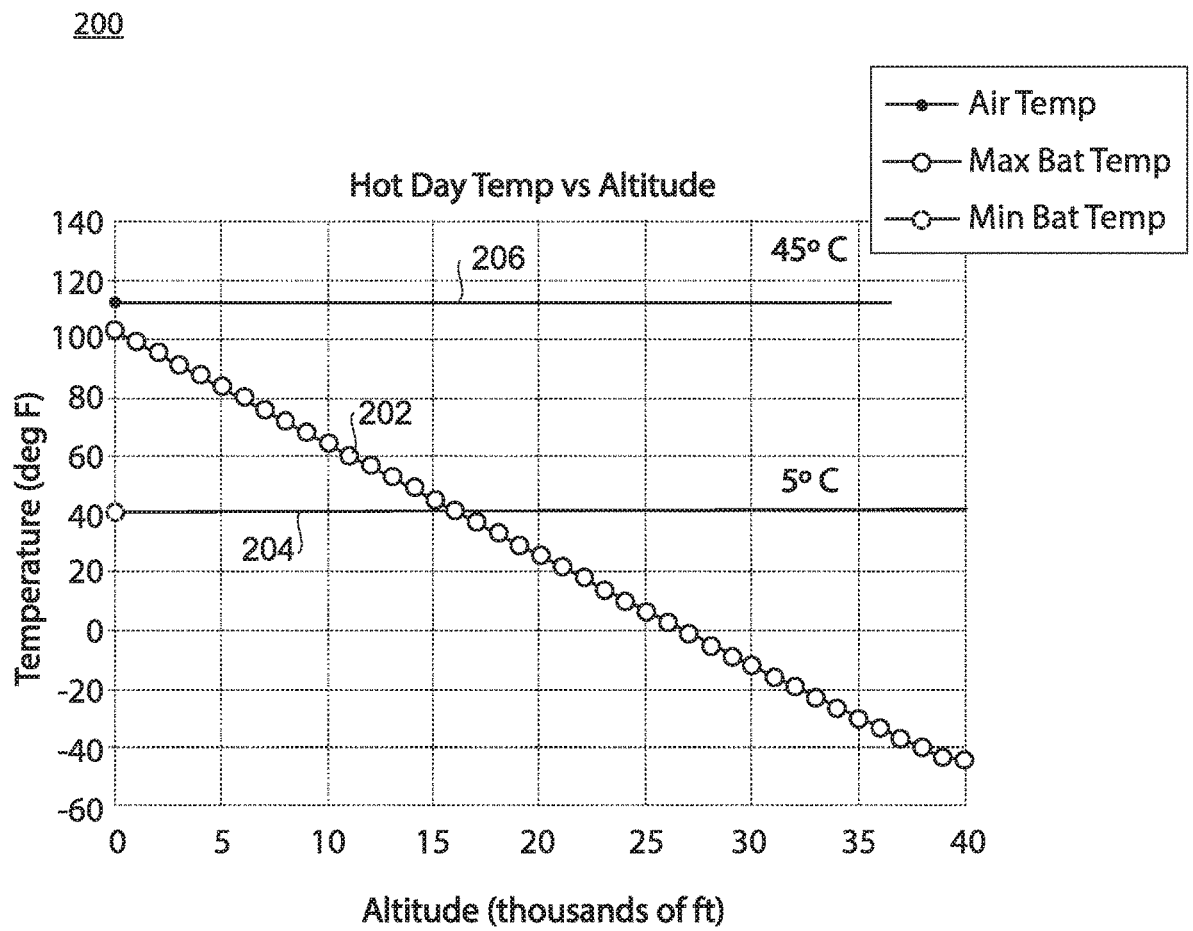
FIG. 2 is a plot representing air temperature versus altitude, showing a maximum and minimum battery temperature.

As shown in FIG. 2, system 100, for example, can be used even on a hot day. On a hot day, as the altitude increases, the temperature of the atmospheric air still decreases to temperatures that can be below the batteries' preferred minimum temperature of operation. Line 202 represents the air temperature, line 204 represents the minimum battery temperature and line 206 represents the maximum battery temperature. Those skilled in the art will readily appreciate that the temperatures shown herein may vary depending on battery chemistry, weather, time of day, or the like. Where, for example, the minimum battery temperature is approximately 5 degrees Celsius, heating to prevent cold soak at those high altitudes may be needed. The pre-determined threshold for the temperature, described above, can be set based on the minimum battery temperature for a given battery chemistry.

A method for controlling a thermal management system, e.g. system 100, for an air vehicle includes sensing a temperature of batteries, e.g. batteries 104, with a temperature sensor, e.g. temperature sensor 107. If the temperature is below a pre-determined threshold, the method includes varying a flow area of a flow path through a liquid heat exchange circuit, e.g. liquid heat exchange circuit 116, with at least one flow restrictor, e.g. control valve 108. Varying the flow area of the flow path through the liquid heat exchange circuit includes at least partially reducing the flow area through the flow path with the control valve if the temperature is below the pre-determined threshold. The method includes operating at least one pump, e.g. one of pumps 109, positioned in the liquid heat exchange circuit upstream from the at least one control valve to provide heating to the batteries if the temperature is below the pre-determined threshold. Operating the pump includes generating heat with mechanical work of the pump (or pumps) and imparting the heat to fluid of the liquid heat exchange circuit. Operating the pump includes driving the pump with a respective motor, e.g. motor 111, and rejecting waste heat from the motor to fluid of the liquid heat exchange circuit.

The method includes closing a bypass valve, e.g. bypass valve 120, positioned in the liquid heat exchange circuit upstream from a liquid-air heat exchanger, e.g. liquid-air heat exchanger 112, if the temperature is below a pre-determined bypass threshold (which can be the same as or different from the pre-determined threshold described above). The method includes opening a bypass line valve, e.g. bypass line valve 110, in a bypass line, e.g. bypass line 118, branching from the liquid heat exchange circuit upstream from a liquid-air heat exchanger, e.g. liquid-air heat exchanger 112, and reconnecting to the liquid heat exchange circuit downstream from the liquid-air heat exchanger. In some embodiments, the method further includes restricting the flow of a heat sink e.g. closing ram air door 115 or a closing a valve that regulates ram air flow. The method includes providing heat to the at least one battery with a battery heat exchanger, e.g. battery heat exchanger 106, in heat transfer communication with the liquid heat exchange circuit.

The methods and systems of the present disclosure, as described above and shown in the drawings, provide for thermal battery control with superior properties including reduced battery storage capacity loss, decreased recharging time, maintained vehicle range, and/or diminished vehicle range loss. The systems and methods of the present invention can apply to automotive batteries, aircraft batteries, terrestrial batteries, or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A battery thermal management system for an air vehicle comprising:
    a liquid heat exchange circuit;
    a ram air heat exchange circuit;
    a liquid-air heat exchanger positioned on the liquid heat exchange circuit and the ram air heat exchange circuit to exchange heat therebetween;
    a ram air door in the ram air heat exchange circuit;
    at least two coolant pumps fluidically connected to the liquid heat exchange circuit, upstream from the battery heat exchanger and downstream from the liquid-air heat exchanger;
    at least one flow restrictor positioned in the liquid heat exchange circuit;
    a controller operatively coupled to the at least one flow restrictor;
    at least one battery in thermal communication with the liquid heat exchange circuit; and
    a temperature sensor operatively connected to the controller and to the at least one battery to sense a temperature of the at least one battery, wherein the at least one flow restrictor is configured and adapted to receive a command from the controller to vary a flow area of a flow path through the liquid heat exchange circuit by at least partially reducing the flow area through the flow path if the temperature of the at least one battery is below a pre-determined threshold, and wherein the ram air door is configured and adapted to receive a command from the controller to at least partially impede flow of ram air to the liquid-air heat exchanger during cold soak conditions.

2. The system as recited in claim 1, further comprising a battery heat exchanger positioned on the liquid heat exchange circuit.

3. The system as recited in claim 2, wherein the at least one flow restrictor is positioned downstream from the battery heat exchanger.

4. The system as recited in claim 1, further comprising at least two motors, each motor operatively connected to a respective one of the at least two coolant pumps to drive the coolant pump.

5. The system as recited in claim 1, further comprising a bypass valve positioned in the liquid heat exchange circuit upstream from the liquid-air heat exchanger.

6. The system as recited in claim 1, further comprising a bypass line branching from the liquid heat exchange circuit upstream from the liquid-air heat exchanger and reconnecting to the liquid heat exchange circuit downstream from the liquid-air heat exchanger.

7. The system as recited in claim 6, further comprising bypass line valve positioned on the bypass line.

8. A method for controlling a thermal management system for an air vehicle comprising:
    sensing a temperature of at least one battery with a temperature sensor, wherein the temperature sensor is operatively connected to a controller and to the at least one battery;
    varying a flow area of a flow path through a liquid heat exchange circuit with at least one flow restrictor positioned in the liquid heat exchange circuit upon command from the controller if the temperature is below a pre-determined threshold, wherein a liquid-air heat exchanger is positioned on the liquid heat exchange circuit and a ram air heat exchange circuit configured and adapted to exchange heat therebetween;
    at least partially impeding flow of ram air to the liquid-air heat exchanger with a ram air door on a ram air heat exchange circuit during cold soak conditions based on a command from the controller; and
    operating at least two coolant pumps positioned in the liquid heat exchange circuit upstream from the battery heat exchanger and downstream from the liquid-air heat exchanger, and upstream from the at least one flow restrictor to provide heating to the at least one battery if the temperature is below the pre-determined threshold, wherein the battery is in thermal communication with the liquid heat exchange circuit.

9. The method as recited in claim 8, further comprising closing a bypass valve positioned in the liquid heat exchange circuit upstream from the liquid-air heat exchanger if the temperature is below a pre-determined bypass threshold.

10. The method as recited in claim 8, further comprising opening a bypass line valve in a bypass line branching from the liquid heat exchange circuit upstream from the liquid-air heat exchanger and reconnecting to the liquid heat exchange circuit downstream from the liquid-air heat exchanger.

11. The method as recited in claim 8, wherein varying the flow area of the flow path through the liquid heat exchange circuit includes at least partially reducing the flow area through the flow path with the at least one flow restrictor if the temperature is below the pre-determined threshold.

12. The method as recited in claim 8, wherein the at least one flow restrictor is positioned in the liquid heat exchange circuit upstream from the liquid-air heat exchanger.

13. The method as recited in claim 8, wherein the at least one flow restrictor is positioned downstream from a battery heat exchanger.

14. The method as recited in claim 8, wherein the temperature sensor is operatively connected to a controller.

15. The method as recited in claim 8, further comprising providing heat to the at least one battery with a battery heat exchanger in heat transfer communication with the liquid heat exchange circuit.

16. The method as recited in claim 8, wherein operating the at least two pumps includes generating heat by performing mechanical work with at least one of the two pumps on fluid of the liquid heat exchange circuit causing a temperature of the fluid to increase.

17. The method as recited in claim 8, wherein operating the at least two pumps includes driving at least one of the two pumps with a motor and rejecting waste heat from the motor to fluid of the liquid heat exchange circuit.

\* \* \* \* \*